United States Patent
Cline et al.

[11] Patent Number: 6,155,978
[45] Date of Patent: *Dec. 5, 2000

[54] THREE-DIMENSIONAL IMAGING BY PROJECTING MORPHOLOGICALLY FILTERED PIXEL DATA

[75] Inventors: Harvey Ellis Cline; William Thomas Hatfield, both of Schenectady, N.Y.

[73] Assignee: General Electric Company, Schenectady, N.Y.

[ * ] Notice: This patent is subject to a terminal disclaimer.

[21] Appl. No.: 09/210,706

[22] Filed: Dec. 9, 1998

[51] Int. Cl.[7] .................................................... A61B 8/00
[52] U.S. Cl. .................................. 600/443; 128/916
[58] Field of Search ................... 600/437, 443, 600/447; 382/128, 257

[56] References Cited

U.S. PATENT DOCUMENTS

4,951,676  8/1990  Collet-Billon ........................... 600/437
5,409,007  4/1995  Saunders et al. ....................... 600/447
5,779,641  7/1998  Hatfield et al. ......................... 600/443

*Primary Examiner*—Francis J. Jaworski
*Attorney, Agent, or Firm*—Marvin Snyder; Douglas E. Stoner

[57] ABSTRACT

In three-dimensional imaging of ultrasound data, speckle artifact data are reduced before the acquired data from a volume of interest are projected onto an image plane. A master controller performs an algorithm that iteratively morphologically filters the pixel data in a volume of interest and then iteratively projects the morphologically filtered data onto a plurality of rotated image planes using a raycasting technique. Morphological filtering is performed by stepping a seven-point kernel through a source data volume of pixel data. The kernel, made up of a central pixel value and the six pixel values adjacent to the central pixel value, is stepped through the entire source data volume. The morphological filtering operation includes at least one erosion step, which removes speckle, followed by an equal number of dilation steps, which restore the imaging data.

27 Claims, 6 Drawing Sheets fig. 1
PRIOR ART fig. 2 fig. 3 fig. 4
PRIOR ART fig. 5
PRIOR ART fig. 6
PRIOR ART

THREE-DIMENSIONAL IMAGING BY PROJECTING MORPHOLOGICALLY FILTERED PIXEL DATA

FIELD OF THE INVENTION

This invention generally relates to imaging of the human anatomy for the purpose of medical diagnosis. In particular, the invention relates to methods and apparatus for three-dimensional imaging of blood vessels in the human body by detecting intensity of ultrasonic echoes reflected from the vessel.

BACKGROUND OF THE INVENTION

The most common modes of diagnostic ultrasound imaging include B- and M-modes (used to image internal, physical structure), Doppler, and color flow (the latter two primarily used to image flow characteristics, such as in blood vessels). In conventional B-mode imaging, ultrasound scanners create images in which the brightness of a pixel is based on intensity of the echo return, i.e., the amplitude of the reflected waves is employed to produce black and white images of the tissues.

Two-dimensional ultrasound images are often hard to interpret due to inability of the observer to visualize the two-dimensional representation of the anatomy being scanned. However, if the ultrasound probe is swept over an area of interest and two-dimensional images are accumulated to form a three-dimensional volume, the anatomy becomes much easier to visualize for both the trained and untrained observer.

B-mode ultrasound imaging suffers from the inherent imaging artifact referred to as speckle. Speckle is the mottling found in the images produced from interference patterns of multiple receive echoes. This mottling is primarily caused by nulls in the acoustic interference pattern, but other anomalies in the image, e.g., random electronic noise, can cause mottling. The acoustic nulls are accentuated by the log compression required to display the full dynamic range of the ultrasound image. These nulls appear as black holes in the image. Speckle noise and artifacts limit the range of acceptable view angles in three-dimensional ultrasound imaging.

Since any parameter which changes the sum of the returning echoes will alter the speckle pattern, a number of conventional methods exist for reducing the speckle image artifact. Examples of such conventional methods include multiple transmit focusing, spatial compounding, frequency compounding and spatial low-pass filtering. The multiple transmit focusing, spatial compounding and frequency compounding techniques suffer from reduced frame rates, whereas spatial low-pass filtering has reduced resolution.

SUMMARY OF THE INVENTION

In a preferred embodiment of the invention, speckle artifact data in three-dimensional ultrasound imaging are reduced before the acquired data from a volume of interest are projected onto an image plane. The apparatus for achieving this result comprises an ultrasound scanner which collects B-mode and/or color flow mode images in a cine memory on a continuous basis or in response to an external trigger event, i.e., for a multiplicity of slices. The data from a respective region of interest for each slice are sent to a master controller, such data forming a volume of interest. The master controller performs an algorithm that iteratively morphologically filters the pixel data in the volume of interest and then iteratively projects the morphologically filtered data onto a plurality of rotated image planes using a ray-casting technique.

In accordance with a preferred embodiment of the invention, the master controller smooths the speckle and/or noise contained in the pixel data by morphological filtering. This filtering is performed by stepping a seven-point kernel through a source data volume of pixel data. The kernel is comprised of a central pixel value and the six pixel values adjacent to the central pixel value, i.e., the respective pairs of adjacent pixel values in the X, Y and Z directions. The kernel is stepped through the entire source data volume, generating morphological filter output values which form a new source data volume having reduced speckle.

The algorithm for performing morphological filtering in accordance with the invention comprises n erosion operations followed by n dilation operations, where n is any positive integer. In a preferred embodiment, n=3.

The morphologically filtered pixel data volume is then projected onto each successive image plane. The projected images, having reduced speckle and noise, are stored as separate frames in the cine memory, each frame being superimposed on the last background frame. These reconstructed frames are then displayed selectively by the system operator. The images clearly show any blood vessels in the object volume. When shown in the cine mode, the vessels rotate and a greater sense of depth perception is obtained as compared to that achieved by imaging a two-dimensional slice.

DETAILED DESCRIPTION OF THE PREFERRED EMBODIMENTS

Figure 1:
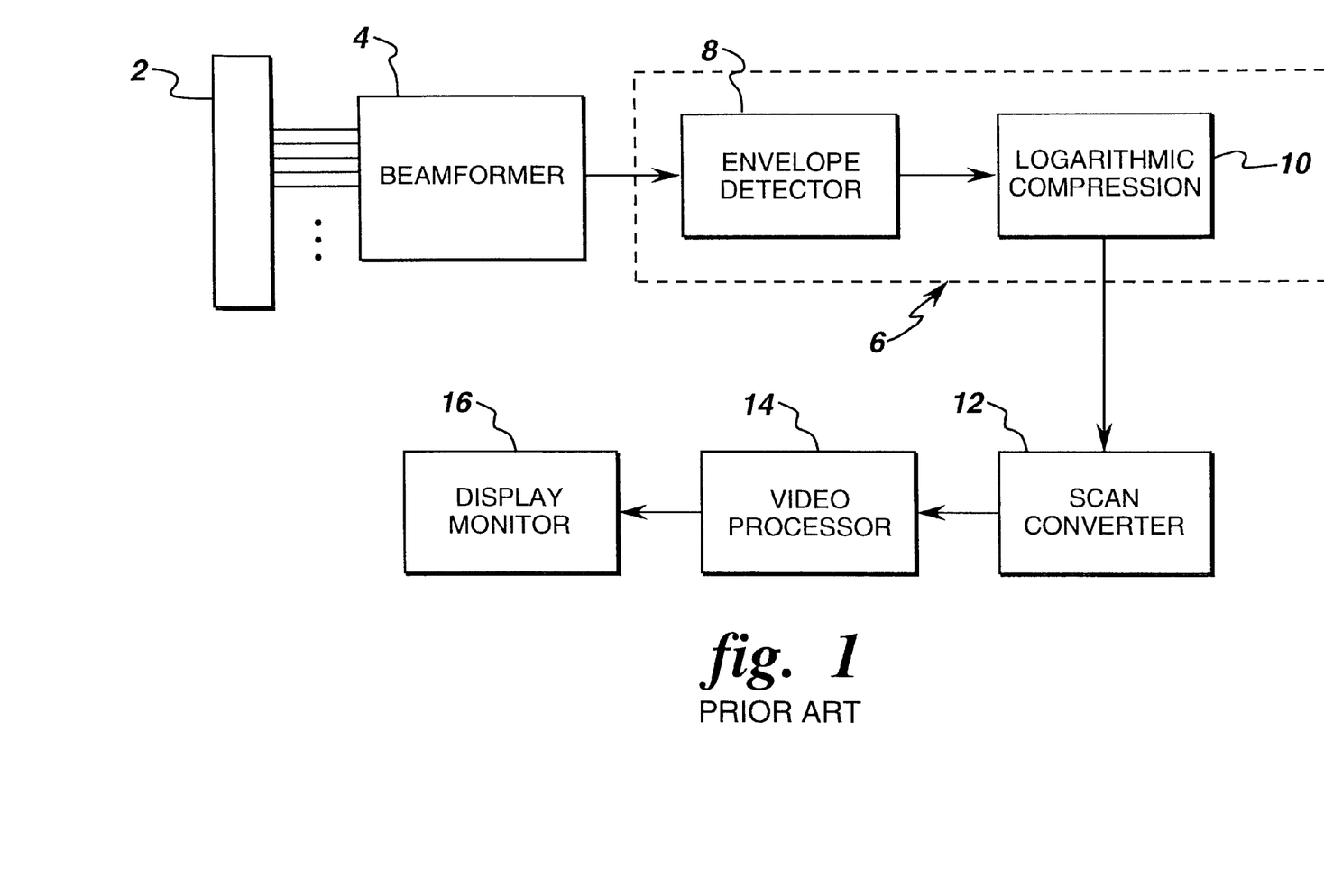
FIG. 1 is a block diagram showing the major functional subsystems within a real-time ultrasound imaging system.

The present invention may be incorporated in an ultrasound imaging system of the type generally depicted in FIG. 1. The individual elements of an ultrasound transducer array 2 are activated by a beamformer 4 to transmit wavelets which are focused at the same transmit focal position with the same transmit characteristics to form a transmit beam. Each transmit beam propagates through the object being scanned and is reflected back to the array by ultrasound scatterers in the object. After each transmit firing, the echo signals detected by the transducer array elements are fed to respective receive channels of beamformer 4. The receive beamformer tracks echoes under the direction of a master controller (not shown in FIG. 1). The receive beamformer imparts the proper receive focus time delays to the received echo signals and sums these signals to provide an RF (radio frequency) echo signal which accurately represents the total ultrasonic energy reflected from a succession of ranges corresponding to a particular transmit focal zone. In a baseband system, the beamformer also transforms the RF echo signal into its I/Q components by means of Hilbert bandpass filtering. The I/Q components are then summed in a receive summer (not shown) for each transmit firing. Hilbert bandpass filtering can alternatively be performed after beam summation. Optionally, the output signal of beamformer 4 is shifted in frequency by a demodulator (not shown). One way of achieving this is to multiply the input signal by a complex sinusoidal $e^{j2\pi f_d t}$, where $f_d$ is the frequency shift required.

In a baseband system, the I/Q components are sent to a B-mode processor 6, which incorporates an envelope detector 8 for forming the envelope of the beamsummed receive signal by computing the quantity $(I^2+Q^2)^{1/2}$. The envelope of the signal undergoes some additional B-mode processing, such as logarithmic compression 10, to form display data which are provided to a scan converter 12. In an RF system, envelope detection is performed on the RF signal.

In general, the display data are converted by scan converter 12 into X-Y format for video display. The scan-converted frames are passed to a video processor 14, which maps the video data to a gray scale or mapping for video display. The gray scale image frames are then sent to a video monitor 16 for display.

The images displayed by video monitor 16 are produced from an image frame of data in which each datum indicates the intensity or brightness of a respective pixel in the display. An image frame may, e.g., comprise a 256×56 data array in which each intensity datum is an 8-bit binary number that indicates pixel brightness. The brightness of each pixel on the display monitor 16 is continuously refreshed by reading the value of its corresponding element in the data array in a well-known manner. Each pixel has an intensity value which is a function of the backscatter cross section of a respective sample volume in response to interrogating ultrasonic pulses and the gray map employed. A conventional ultrasound imaging system typically employs a variety of gray maps, which are simple transfer functions of the raw acoustic sample data to display gray values.

Figure 2:
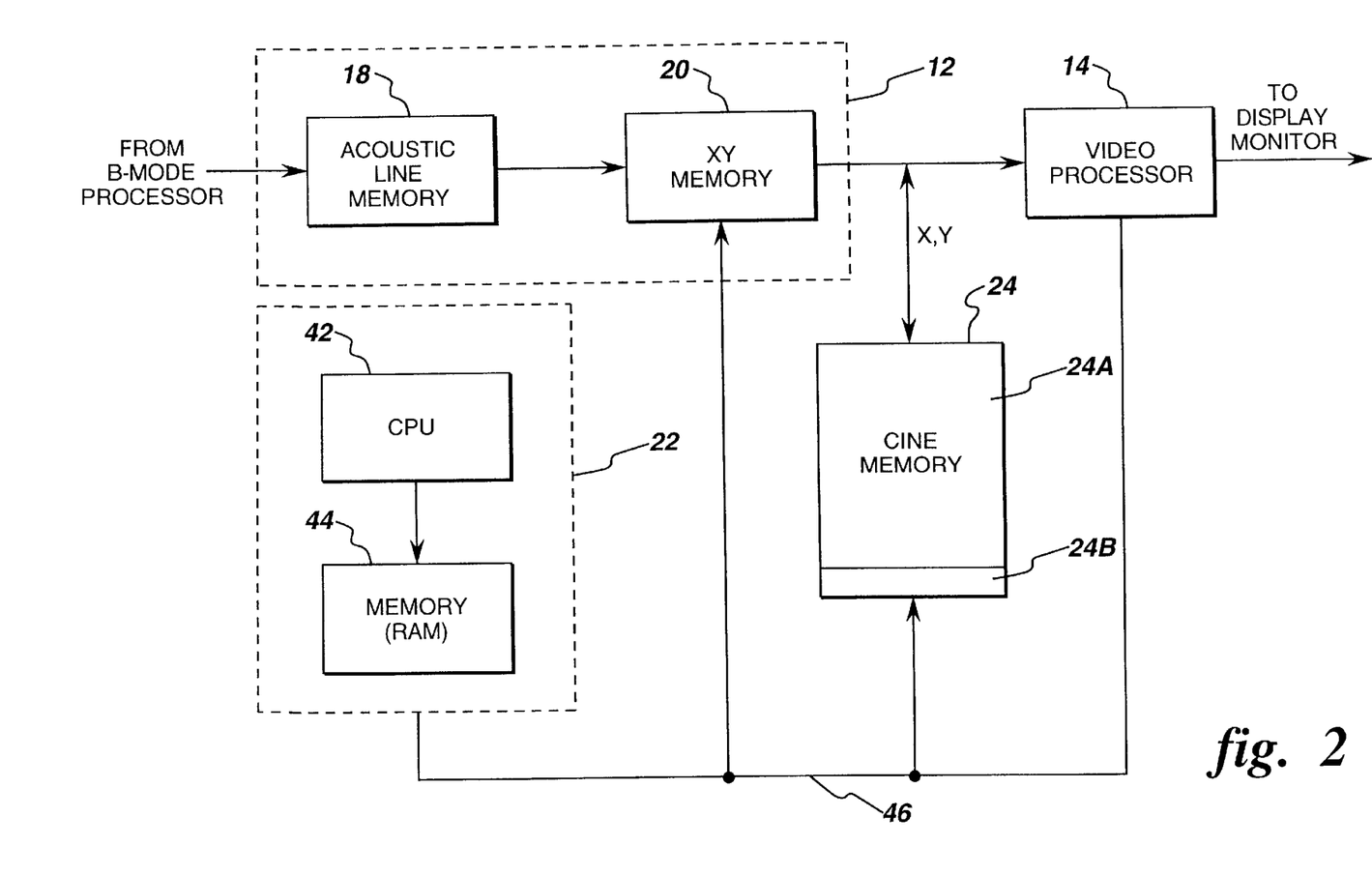
FIG. 2 is a block diagram showing the means for reconstructing frames comprising successive volumetric projections of morphologically filtered intensity pixel data in accordance with a preferred embodiment of the invention.

As shown in FIG. 2, system control is centered in a host computer or master controller 22, which accepts operator inputs through an operator interface (not shown) and in turn controls the various subsystems. Master controller 22 also generates the system timing and control signals which are distributed via a system control bus 46 and a scan control bus (not shown).

The scan converter 12 comprises an acoustic line memory 18 and an XY display memory 20. Acoustic line memory 18 accepts processed digital data from the B-mode processor and performs the coordinate transformation of the B-mode data from polar coordinate (R-θ) sector format or Cartesian coordinate linear array to appropriately scaled Cartesian coordinate display pixel data stored in XY display memory 20. In the B-mode, intensity data are stored in XY display memory 20, each address storing three 8-bit pixels. Video processor 14 multiplexes between graphics data, image data, and timeline data to generate the final video output signal in a raster scan format on video monitor 16 and, additionally, provides for various grayscale maps.

A multiplicity of successive frames of B-mode data are stored in a cine memory 24 on a first-in, first out basis. Cine memory 24 operates like a circular image buffer that runs in the background, continually capturing image data that are displayed in real time to the user. When the user freezes the system, the user has the capability to view image data previously captured in cine memory. The cine memory provides resident digital image storage for single image review and multiple image loop review and various control functions. The region of interest displayed during single-image cine replay is that used during acquisition of the image. Cine memory 24 also acts as a buffer for transfer of images to digital archival devices via master controller 22.

Master controller 22 comprises a central processing unit (CPU) 42 and a random access memory 44. CPU 42 has read only memory incorporated therein for storing routines used in transforming the acquired volume of intensity data into a multiplicity of three-dimensional projection images taken at different angles. CPU 42 controls XY memory 20 and cine memory 24 via system control bus 46. In particular, CPU 42 controls the flow of pixel data from XY memory 20 to video processor 14 and to cine memory 24, and from the cine memory to the video processor and to the CPU itself. Each frame of intensity data, representing one of a multiplicity of parallel scans or slices through the object being examined, is stored in XY memory 20 and in the next cycle is transmitted to video processor 14 and to cine memory 24. A stack of frames, representing the scanned object volume, is stored in section 24A of cine memory 24. During initialization (see step 26 in FIG. 3), CPU 42 retrieves from cine memory section 24A only the intensity data corresponding to an object volume of interest. This is accomplished by retrieving only the intensity data in a region of interest from each stored frame acquired from any scan which intersected the object volume of interest. Thus the intensity data corresponding to the region of interest from each one of a stack of successive frames forms a source data volume of interest.

Figure 4:
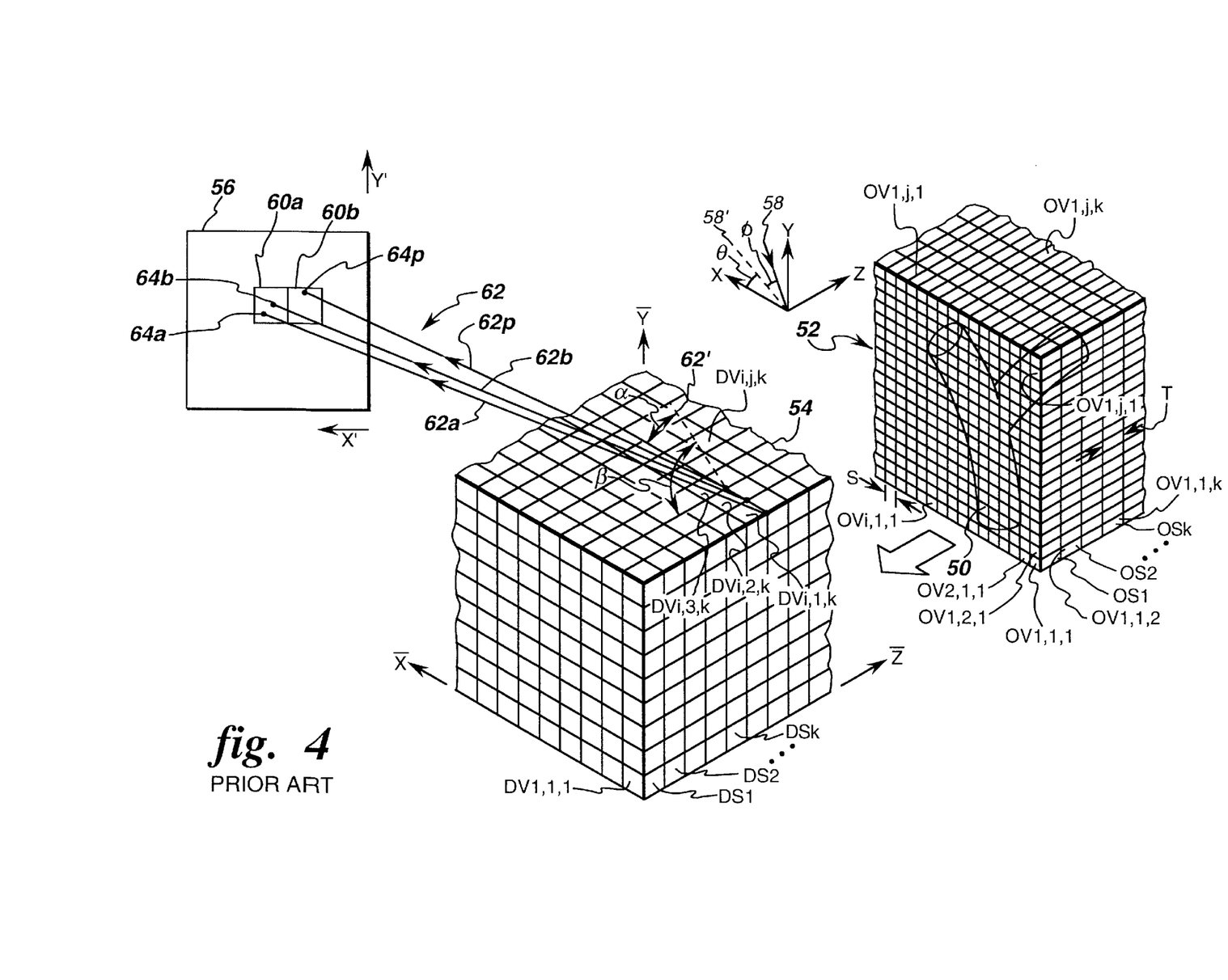
FIG. 4 is a schematic illustration of the sampled object volume of interest, an associated data volume and an image projection plane involved in volumetrically rendering a reversed ray-cast projection in accordance with the prior art.

The source data volume, schematically depicted in FIG. 4, is generated by scanning an object volume 52 with an ultrasound transducer. Object volume 52 is scanned in such a manner as to create a series of stacked, contiguous slices or sheets $OS_1, OS_2, \ldots, OS_k$, each of which contains the same number of object volume elements (voxels) OV. Each voxel has a rectangular profile in the sheet plane (say, the X-Y plane); while the complementary sides may be of equal length S, so that this profile may be square, the sheet thickness T is generally not equal to the length of either side. Thus the first object slice $OS_1$ contains a first multiplicity of object voxels $OV_{i,j,1}$, where i and j are the respective X-axis and Y-axis positions of the voxel. Similarly, the second object slice $OS_2$ contains object voxels $OV_{i,j,2}$. An arbitrary object slice $OS_k$ contains voxels $OV_{i,j,k}$, where k is the Z-axis position of that voxel. Each object voxel $OV_{i,j,k}$ is analyzed and the data value (intensity, velocity or power) thereof is placed in a corresponding data voxel $DV_{i,j,k}$ of a data volume 54. Data volume 54 is a simple cubic i,j,k lattice, even though the thickness of each object slice $OS_k$ and each object voxel face size (the size of the voxel in the X-Y plane) will generally not be the same. That is, not only may the object volume have different X, Y and Z dimensions for each voxel, but also the total number of voxels in any dimension need not be the same. For example, a typical ultrasound three-dimensional scan may provide each slice with a 256×256 matrix of voxels, and may involve 128 slices.

Figure 3:
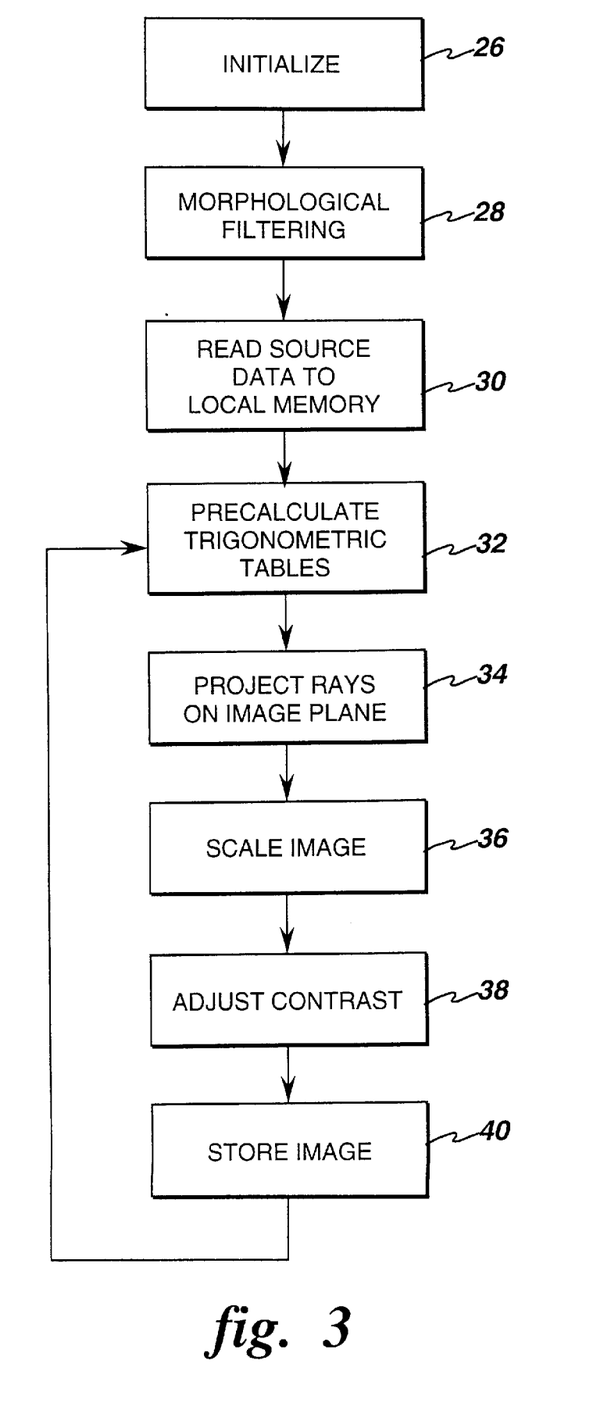
FIG. 3 is a flowchart showing the steps of an algorithm for reconstructing frames comprising successive volumetric projections of morphologically filtered intensity pixel data in accordance with a preferred embodiment of the invention.

As seen in FIG. 3, the intensity data in the pixel data set corresponding to the object volume of interest are morphologically filtered (step 28) prior to projection in order to smooth speckle noise and reduce artifacts. This prevents loss of data due to speckle noise during projection. For example, blood vessels are less echogenic than the surrounding tissue. Therefore, vessels can be imaged using minimum intensity projections. Alternatively, in the reverse video/minimum mode, the intensity data are inverted to make the vessels bright instead of dark. The vessels can then be imaged using maximum intensity projections. To prevent selection of maximum intensities which are bright speckle as opposed to desired pixel data, a filter can be used to remove such bright speckle intensities prior to projection. Both morphological filtering and projection are preferably performed by the master controller, but could also be performed by respective dedicated processors.

In accordance with a preferred embodiment of the invention, the source data volume is filtered by CPU 42 (FIG. 2) using a morphological filter which operates on a kernel comprised of a central pixel value in the source data volume and the six pixel values adjacent to the central pixel value. The kernel is stepped through the entire source data volume, generating morphological filter output values which form a new source data volume having reduced speckle. The algorithm for performing morphological filtering in accordance with the invention comprises n erosion operations followed by n dilation operations, where n is any positive integer. In the preferred embodiment, n=3. If the central pixel value of the kernel is designated $DV_{ij,k}$, the adjacent pixel values in the ±X directions are designated $DV_{i+1j,k}$ and $DV_{i-1j,k}$ respectively, the adjacent pixel values in the ±Y directions are designated $DV_{ij+1,k}$ and $DV_{ij-1,k}$ respectively, and the adjacent pixel values in the ±Z directions are designated $DV_{ij,k+1}$ and $DV_{ij,k-1}$ respectively, the erosion operation comprises the following steps. For each kernel, the processor determines the relative amplitudes of the central pixel value DVij,k and the two pixel values $DV_{i+1j,k}$ and $DV_{i-1j,k}$ along the X axis. There are four possibilities: (1) $DV_{i+1j,k}<DV_{ij,k}<DV_{i-1j,k}$; (2) $DV_{i+1j,k}>DV_{ij,k}>DV_{i-1j,k}$; (3) $DV_{i+1j,k}<DV_{ij,k}>DV_{i-1j,k}$; (4) $DV_{i+1jk}>DV_{ij,k}<DV_{i-1j,k}$. Depending on which possibility applies, the processor then computes the gradient $G_x$. For possibility 1, $G_x=DV_{i+1j,k}-DV_{ij,k}$; for possibility 2, $G_x=DV_{ij,k}-DV_{i-j,k}$; for possibility 3, $G_x=[(DV_{i+1j,k}-V_{ij,k})^2+(DV_{ij,k}-Dv_{i-1j,k})^2]^{1/2}$; and for possibility 4, $G_x=0$. The foregoing steps are repeated for the Y and Z directions. For the Y direction, the processor determines the relative amplitudes of the central pixel value $DV_{ij,k}$ and the two pixel values $DV_{ij+1,k}$ and $DV_{ij-1,k}$. Again there are four possibilities: (1) $DV_{ij+1,k}<DV_{ij,k}<DV_{ij-1,k}$; (2) $DV_{ij+1,k}>DV_{ij,k}>DV_{ij-1,k}$; (3) $DV_{ij+1,k}<DV_{ij,k}>DV_{ij-1,k}$; (4) $DV_{ij+1,k}>DV_{ij,k}<DV_{ij-1,k}$. Depending on which possibility applies, the processor then computes the gradient $G_y$. For possibility 1, $G_y=DV_{ij+1,k}-DV_{ij,k}$; for possibility 2, $G_y=DV_{ij,k}-DV_{ij-1,k}$; for possibility 3, $G_y=[(DV_{ij+1,k}-DV_{ij,k})^2+(DV_{ij,k}-DV_{ij-1,k})^2]^{1/2}$; and for possibility 4, $G_y=0$. For the Z direction, the processor determines the relative amplitudes of the central pixel value $DV_{ij,k}$ and the two pixel values $DV_{ij,k+1}$ and $DV_{ij,k-1}$. Again there are four possibilities: (1) $DV_{ij,k+1}<DV_{ij,k}<DV_{ij,k-1}$; (2) $DV_{ij,k+1}>DV_{ij,k}>DV_{ij,k-1}$; (3) $DV_{ij,k+1}<DV_{ij,k}>DV_{ij,k-1}$; (4) $DV_{ij,k+1}>DV_{ij,k}<DV_{ij,k-1}$. Depending on which case applies, the processor then computes the gradient $G_z$ as follows: For possibility 1, $G_z=DV_{ij,k+1}-DV_{ij,k}$; for possibility 2, $G_z=DV_{ij,k}-DV_{ij,k-1}$; for possibility 3, $G_z=[(DV_{ij,k+1}-DV_{ij,k})^2+(DV_{ij,k}-DV_{ij,k-1})^2]^{1/2}$; and for possibility 4, $G_z=0$. The processor then computes the quantity:

$$G' = \frac{1}{3}\sqrt{G_x^2 + G_y^2 + G_z^2}$$

The quantity G' is then subtracted from pixel value $DV_{ij,k}$ to form a new pixel value $DV_{ij,k}'$. When all values in the source data volume (stored in a first buffer memory) have been eroded in the foregoing manner, the resulting values form a once-eroded data volume which is stored in a second buffer memory within the master controller. Although the invention is broad enough to cover the situation where speckle is removed from the source data volume using only one erosion (and only one dilation), in accordance with a preferred embodiment the source data volume is eroded three times, i.e., the once-eroded data volume is eroded to form a twice-eroded data volume, which can be stored in the first buffer memory (or a third buffer memory). The twice-eroded data volume is in turn eroded to form a thrice-eroded data volume (e.g., stored in the second buffer memory).

After the desired number of erosions, the master controller performs an equal number of dilation steps. The dilation operation will be described using the same data value designations as those used in the discussion of erosion, with the understanding that the data values dilated in the first dilation are those from the thrice-eroded data volume rather than the data values from the source data volume. For each dilation, the processor steps the kernel of seven pixel values through the data volume. For each kernel, the process determines the relative amplitudes of a central pixel value $DV_{ij,k}$ and the two pixel values $DV_{i+1j,k}$ and $DV_{i-1j,k}$ along the X axis. Again there are four possibilities: (1) $DV_{i+1j,k}<DV_{ij,k}<DV_{i-1j,k}$; (2) $DV_{i+1j,k}>DV_{ij,k}>DV_{i-1j,k}$; (3) $DV_{i+1j,k}<DV_{ij,k}>DV_{i-1j,k}$; (4) $DV_{i+1j,k}>DV_{ij,k}<DV_{i-1j,k}$. Depending on which possibility applies, the processor then computes the gradient $G_x$ as follows: for possibility 1, $G_x=DV_{ij,k}-DV_{i-1j,k}$; for possibility 2, $G_x=DV_{i+1j,k}-DV_{ij,k}$; for possibility 3, $G_x=0$; and for possibility 4, $G_x=[(DV_{i+1j,k}-DV_{ij,k})^2+(DV_{ij,k}-DV_{i-1j,k})^2]^{1/2}$. The foregoing steps are repeated for the Y and Z directions. For the Y direction, the processor determines the relative amplitudes of the central pixel value $DV_{ij,k}$ and the two pixel values $DV_{ij+1,k}$ and $DV_{ij-1,k}$ and then computes the gradient $G_y$. For the Z direction, the processor determines the relative amplitudes of the central pixel value $DV_{ij,k}$ and the two pixel values $DV_{ij,k+1}$ and $DV_{ij,k-1}$, and then computes the gradient $G_z$. The processor again computes the quantity G'. Unlike erosion, where the quantity G' was subtracted from the pixel value $DV_{ij,k}$, for dilation, G' is added to the pixel value $DV_{ij,k}$ to form the new pixel value $DV_{ij,k}'$. When all values in the thrice-eroded data volume (retrieved from the second buffer memory) have been dilated in the foregoing manner, the resulting values form a once-dilated data volume which is stored in the first buffer memory. The once-dilated data volume is then dilated in the foregoing manner to form a twice-dilated data volume, which can be stored in the second buffer memory. The twice-dilated data volume is in turn dilated to form a thrice-dilated (i.e., morphologically filtered) data volume (e.g., stored in the first buffer memory). This morphologically filtered data volume has reduced speckle.

Following morphological filtering, CPU 42 (FIG. 2) performs a series of transformations on the morphologically filtered data volume using the ray casting algorithm disclosed in U.S. Pat. No. 5,226,113, issued Jul. 6, 1993 and assigned to the instant assignee. The successive transformations represent maximum, minimum or averaged intensity, velocity or power projections made at angular increments, e.g., at 10° intervals, within a range of angles, e.g., +90° to −90°. However, the angular increment need not be 10°; nor is the invention limited to any particular range of angles.

In accordance with the ray casting technique employed in a preferred embodiment, volumetrically rendered projection images of a sample 50 (see FIG. 4) are displayed from any arbitrary viewing angle, e.g., a spherical projection angle denoted by angle parameters (θ,φ), where θ is the angle that an extension 58' of a viewing ray 58 makes upon the X-Y plane, and φ is the angle of ray 58 with respect to extension 58', In particular, and as shown in FIG. 4, an image of object 50 is projected (step 34 in FIG. 3) by CPU 42 (FIG. 2) toward the image plane 56 from a lattice point in data voxel $DV_{i,j,k}$. For convenience, the lattice point may, for example, be the data voxel vertex closest to the data volume origin. The cast ray 62 leaves the data volume 54 at a projection angle with spherical angular parameters (α,β) transformed from the spherical angular parameters (θ,φ) at which the object volume 52 is viewed. These two angles are not the same, due to the geometric distortion caused by use of a cubic data volume 54 with a non-cubic object volume 52. However, the projected ray 62 has an $\bar{x}$-$\bar{y}$ plane extension 62' which makes an angle α with respect to the axis of the data volume, and makes an angle β with the Z axis. Thus, angles α and β are determined by a rotation process (to be discussed hereinbelow) to correspond to viewing the object volume 52 at the desired viewing angle (θ,φ) (assuming operation in spherical coordinates). Each of rays 62 is cast from the data volume voxel lattice point toward the image plane.

While all rays 62 impinge upon some portion of the image plane, only those rays falling within the image plane pixel 60a under consideration are allowed to contribute to the data for that image plane pixel. Thus, having chosen a portion of the object volume 52 to view and a viewing angle (θ,φ) at which to view this selected object volume, the data value in each voxel of the corresponding portion of the data volume is cast at some angle (α,β) (corresponding to viewing the distorted data volume with respect to the object volume) toward the image plane 56. The data value in a first voxel (say, voxel $DV_{i,1,k}$) is thus back-projected along ray 62a, in accordance with the θ and φ values chosen. This ray 62a impinges upon image plane 56 at a position 64a within pixel 60a, and, as this is the first ray to impinge upon this pixel, the intensity, velocity or power value of the incident data is attributed to (stored in) the desired pixel 60a. The next voxel in the data volume (say voxel $DV_{i,2,k}$) has its associated ray 62b projected at the same angular (α,β) configuration from the voxel lattice point to position 64b upon image plane 56. Assuming that impingement position 64b is within desired pixel 60a, the second projected value is (for a maximum pixel projection) compared with the now stored first value, and the larger value is placed in storage for pixel 60a. For an averaged-value projection, the value of a current projected data voxel is added to the sum already stored for the image panel pixel upon which that projection ray impinges, and the sum is eventually divided by a counted number of such impinging rays for that pixel. As each voxel in the selected data volume is sequentially entered and projected toward image plane 56, a data volume voxel (say, voxel $DV_{i,3,k}$) is eventually projected along its associated ray 62p and does not impinge within the desired pixel 60a, so that its data value (e.g., intensity) is not compared to the data value presently stored for pixel 60a. The maximum data value for pixel 60a is now established, for that projection of the data at the particular (θ,φ) three-dimensional angle of view. However, ray 62p does, in fact, have an impingement point 64p which falls within another image plane pixel (say, pixel 60b) and is compared to the data value stored therein, and the larger value is, after the comparison, returned to storage for that pixel. All data values are reset to zero when a new projection is to be taken. Thus, each of the image plane pixels is reset at the start of an image projection procedure, and all of the data volume voxels (in the entire space or in the selected portion, as set by the portion of object volume 52 selected) are individually and sequentially scanned. The data value in each data voxel DV is projected through an associated ray 62 to impinge upon image plane 56 in one pixel 60a thereof, with the maximum value in each pixel being compared against the present value of the ray-casted data volume voxel to determine the larger thereof, which larger value is then stored as part of the maximum value image. In practice, for a maximum pixel projection, the stored maximum value will be changed only if the newly cast data voxel value is greater than the data value already stored for the image plane pixel upon which the newly cast ray impinges.

Figure 5:
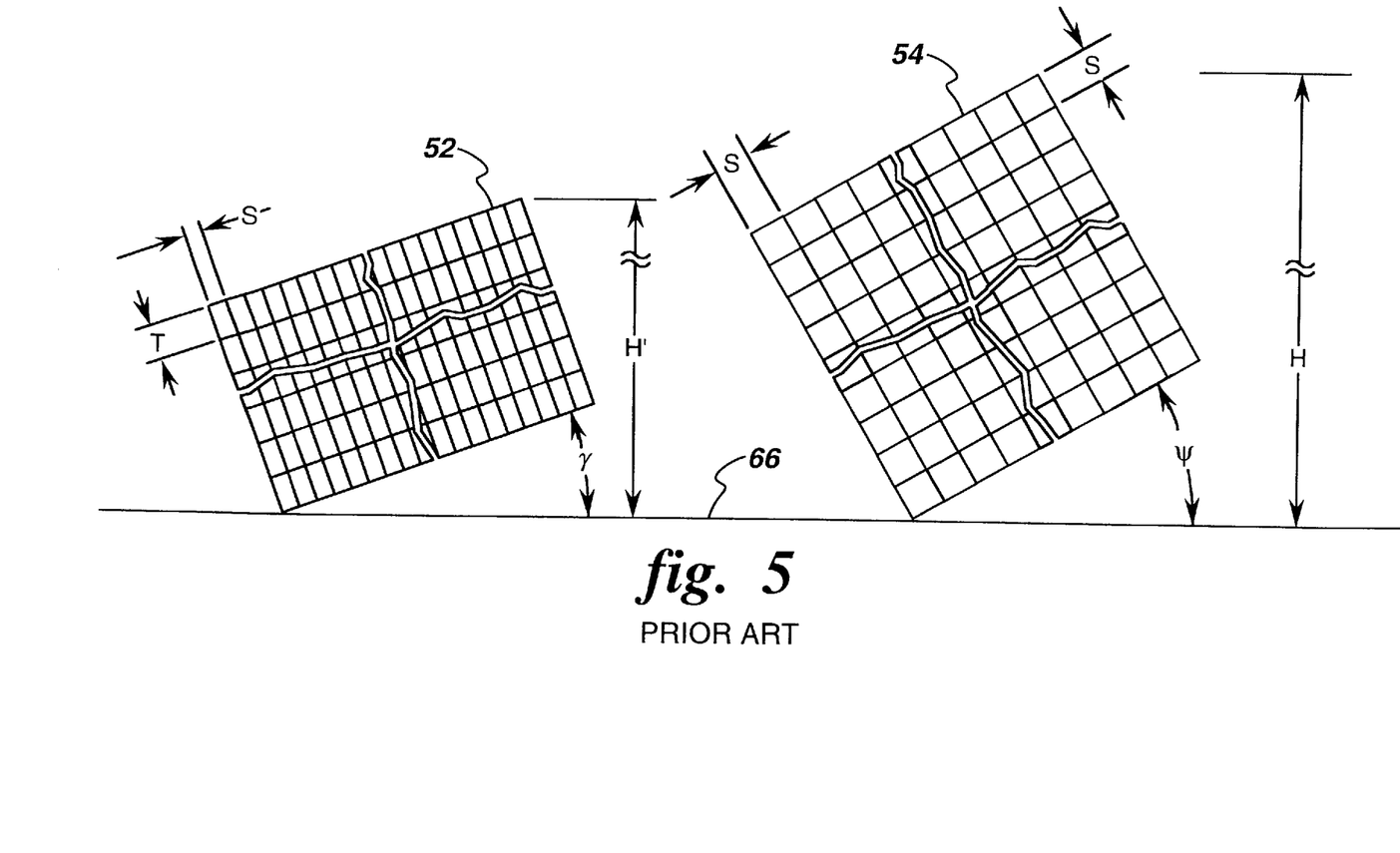
FIG. 5 is a schematic illustration showing a pair of geometric two-dimensional configurations corresponding to like views of object and data volumes, and useful in defining necessary scaling constants in three-dimensional ultrasound imaging.

In accordance with another aspect of the foregoing technique, the data projection is scaled (step 36 in FIG. 3) and any anisotropy between the object volume and the image plane is removed by only a single set of calculations after back projection is complete. Because object volume 52 is a real volume while data volume 54 is an abstract concept, it is necessary to determine the amount of distortion of the data projection due to the presentation of the cubic data volume lattice 54 at a different angle γ, in a first plane, as shown in FIG. 5, which is different than the angle ψ at which an arbitrary viewing direction 66 will be positioned with respect to both the object volume 52 and data volume 54. The apparent dimensions of each voxel will change as the effective elevation angles ψ and γ change. If the aspect ratio A (defined as the ratio of the actual slice thickness T in object volume 52 to the actual pixel size S in the same object volume 52) is not unity (i.e., is greater or less than unity, as the object voxel is not a cubic voxel, as will be encountered in data volume 54), then the angles of elevation ψ and γ will be different, and the effective elevation angle ψ in the data volume will be different than the actual elevation angle γ in the object volume. Rotation of the data is in accordance with an object elevation angle obtained by:

$$\psi = \tan^{-1}\left(\frac{1}{A}\tan[\gamma]\right).$$

Thereafter, the projected data can be scaled to have the correct height (if rotation is about the horizontal axis) in the object volume by multiplication of all projected data heights by the elevation scale factor. The old projected image height H can be corrected with an effective scale factor $E_s$, where $$E_s = \sqrt{(A\cos\gamma)^2 + \sin^2\gamma}$$

and the new height H'=H•$E_s$. The same is true for the width when rotation is about the vertical axis.

Utilizing the above relationship, the rotation of data volume angles (α,β) becomes angles (θ,φ), respectively, because the distortion is only along one axis, so that angle θ equals angle α. The elements of the 3×3 rotational matrix [M] can be determined, and given the two involved rotational angles, these relationships are used to determine the data volume-to-image plane transformations:

X'=M1X+M2Y+M3Z+XO

Y'=M4X+M5Y+M6Z+YO where M1–M6 are the first two rows of the rotational matrix (i.e., M1=−sin θ, M2=cos θ sin ψ, M3=0, M4=−cos θ sin ψ2, M5=−sin θ sin ψ, and M6=cos ψ), X' and Y' are the locations on the image plane of the projected point, and XO and YO are image plane X and Y offsets (respectively referenced to the X and Y lowest value points) at which the selected portion of the image plane begins. After the data are projected onto image plane 56, the image is scaled to correct for the effect of the anisotropic object voxels. It will be seen that factors M1–M6 can be precalculated (step 32 in FIG. 3) at the beginning of a projection (given θ and φ) and used for all rotation calculations.

Figure 6:
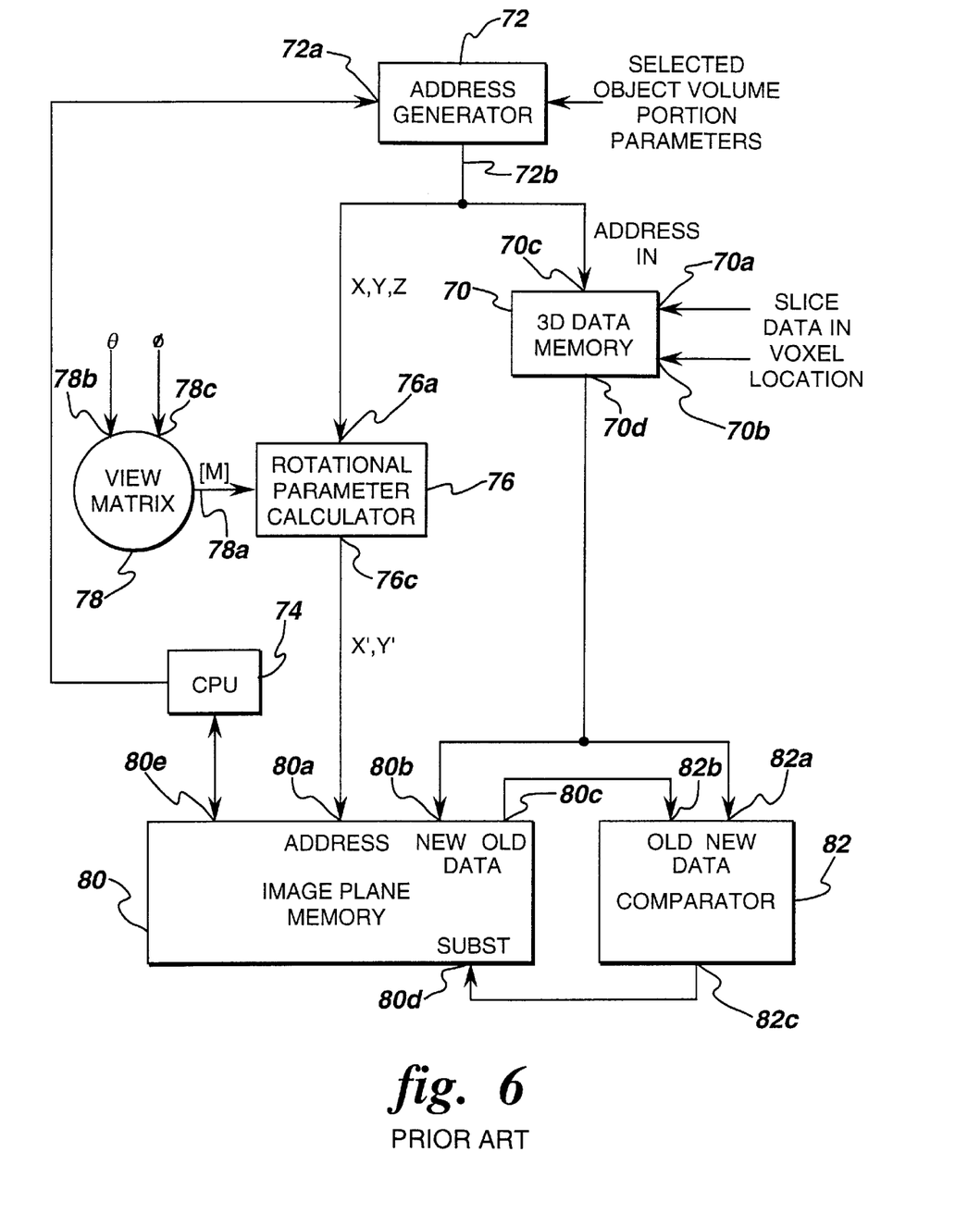
FIG. 6 is a block diagram of means for providing a maximum intensity projection in three-dimensional ultrasound imaging.

FIG. 6 shows means for performing the above-described ray-casting technique which are incorporated in master controller 22 (FIG. 2) or a separate dedicated processor. Such means comprise a three-dimensional data memory 70 for storing slice data as received at a data input 70a from cine memory 24 (FIG. 2). The data associated with each object voxel are stored at the address of that voxel, responsive to voxel address input information received at a voxel address input 70b from a CPU 74. Once the data memory is filled (corresponding to the transfer of all required data from, as shown in FIG. 4, object volume 52 to data volume 54), the object volume portion of interest is selected and data establishing its starting corner and extent in the X, Y and Z directions is sent from CPU 74 to an input 72a of an address generator 72. The address sequentially provides, at an address output 72b, the X,Y,Z addresses of each voxel within the object volume selected. Output 72b is coupled to an output-data-address input 70c of data memory 70, causing the stored intensity data for that one voxel then addressed to be provided from data memory output 70d. The sequence of voxel X,Y,Z addresses is also provided to a first input 76a of a rotational parameter calculator 76, which receives angle (α,β) information via CPU 74 as the calculated matrix element M1–M6 values, to provide at an output 76c the address X',Y' of the image plane pixel corresponding to that object X,Y,Z pixel when viewed at a selected viewing angle (θ,φ). The viewing angle (θ,φ) information is entered into the system and processed by CPU 74. The results are entered into inputs 78b and 78c of a viewing matrix means 78, to provide matrix elements M1–M6 at its output 78a and then to rotational parameter calculator 76. The image plane pixel address X',Y' appears at an address input 80a of a frame buffer acting as an image plane memory 80. Simultaneously, the intensity data, projected from the data volume to the projection plane, appears at the image plane memory new data input 80b, from three-dimensional data memory output 70d. These data also appear at the new data input 82a of a data comparator 82. Intensity data previously saved in image plane memory 80 for that address, at input 80a, appear at an old data output 80c, and thence at an old data input 82b of comparator means 82. The old and new data at inputs 82b/82a, respectively, are compared in comparator 82 and an output 82c thereof is enabled to a selected logic condition (e.g., a high logic level) if the new data at input 82a have greater amplitude than the old data at input 82b. Output 82c is coupled to a substitute-control data input 80d of image plane memory 80, to cause the data stored at the address controlled by input 80a to be changed to accept the new data at input 80b, if substitute-data control input 80d is at the selected logic level. Thus, the stored data are initially reset, as by a signal through a data/control port 80e (from CPU 74), and the data of greatest value are stored for each image plane pixel location X',Y' responsive to a comparison indicating that the new data exceed the value of the previously stored old data. After all of the selected addresses have been sequentially scanned by address generator 72, the data stored in image plane memory 80 are scaled in CPU 74, and the scaled image plane data can be withdrawn from memory 80 for display, permanent storage or similar purposes.

In accordance with a further aspect of the invention, the scaled image plane data are mapped, prior to display, to achieve a desired brightness and contrast range (step 38 in FIG. 3). While reading in the region of interest for the source frames on which the three-dimensional reconstruction is based, a histogram of the number of pixels with a given intensity is optionally created in master controller 22. Alternatively, the histogram can be formed using the projected images. At the same time, the maximum pixel intensity is determined. The pixels in each bin are counted until a given percentage of the total number of pixels is reached. This bin number becomes the pixel threshold. A map is then created such that each pixel value is mapped to the desired brightness and contrast range above or below the pixel threshold, depending on the intended result.

The pixels in the region of interest from each slice or frame stored in cine memory 24 (FIG. 1) are morphologically filtered by CPU 42 and then stored in memory 44 (see FIG. 2). The region-of-interest pixels stored in the cine memory can be read therefrom and supplied to the morphological filter as successive pixels or as an array of pixels.

The morphological filtering and projection techniques described above can be separately applied to B-mode intensity data and color flow velocity or power data for the data volume of interest retrieved from the cine memory. Each pixel in the projected image would include the intensity data and the velocity or power data derived by morphological filtering and projection onto a given image plane. In addition, when the cine memory is frozen by the operator, then as indicated in FIG. 2, CPU 42 optionally stores the last frame from XY memory 20 at multiple successive addresses in section 24B of cine memory 24. The projected image data for the first projected view angle is written into the first address in cine memory section 24B, so that the projected image data in a region of interest are superimposed on the background frame. This process is repeated for each angular increment until all projected images are stored in cine memory section 24B, each projected image frame being made up of a region of interest containing transformed data and, optionally, a background perimeter surrounding the region of interest and composed of background frame data not overwritten by region-of-interest transformed data. The background image makes it clearer where each displayed projection is viewed from. The operator can then select any one of the projected images for display. In addition, the sequence of projected images can be replayed on the display monitor to depict the object volume as if it were rotating in front of the viewer.

In accordance with a preferred embodiment of the invention, the ultrasound imaging system has a plurality of different projection modes. For example, the projection may include maximum or minimum value pixels. Alternatively, a mode useful in imaging blood vessels may be selected wherein the pixel data are inverted and then the maximum values are projected onto the image plane. In accordance with a further mode, the ray-casting technique can be employed to provide a surface rendering.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. An imaging system, comprising:
a memory for storing a source data volume of source pixel values;
a data processor programmed to:
(a) morphologically filter said source data volume to form a morphologically filtered data volume having less speckle than said source data volume, and
(b) project said morphologically filtered data volume onto an image plane to form a projected data set representing a projected image; and
a display monitor for displaying said projected image in the form of a multiplicity of pixels.

2. The imaging system as defined in claim 1, further comprising:
an ultrasound transducer array including a multiplicity of transducer elements;
a beamformer coupled to said transducer elements for pulsing said transducer elements during a series of transmit firings and for acquiring a respective receive signal from said transducer elements subsequent to each transmit firing;
a signal processor programmed to form respective image signals from the receive signals; and
a scan converter for converting said image signals into said source data volume of pixel values and for providing said source data volume to said memory for storage therein.

3. The imaging system as defined in claim 1, wherein the data processor is programmed to morphologically filter said source data in n erosion steps followed by n dilation steps, where n is a positive integer.

4. The imaging system as defined in claim 3, wherein n=3.

5. The imaging system as defined in claim 3, wherein a first erosion step programmed in said data processor comprises:
(a) for each of first, second and third directions, determining the relative values of a central source pixel value and first and second source pixel values adjacent to said central source pixel value, and computing first, second and third erosion gradients, respectively, each of said first, second and third erosion gradients being a function of a difference between said central source pixel value and one of said first and second source pixel values for the respective direction;
(b) computing an erosion quantity as a function of said first, second and third erosion gradients; and
(c) subtracting said erosion quantity from said central source pixel value to form an eroded pixel value.

6. The imaging system as defined in claim 5, wherein a first dilation step programmed in said data processor comprises:
(a) for each of first, second and third directions, determining the relative values of a central eroded pixel value and first and second eroded pixel values adjacent to said central eroded pixel value, and computing first, second and third dilation gradients, respectively, each of said first, second and third dilation gradients being a function of a difference between said central eroded pixel value and one of said first and second eroded pixel values for the respective direction;
(b) computing a dilation quantity as a function of said first, second and third dilation gradients; and
(c) adding said dilation quantity to said central eroded pixel value.

7. The imaging system as defined in claim 6, wherein said first erosion gradient for said first erosion step comprises one of the following values:
(a) a first difference between said central source pixel value and said first source pixel value if said central source pixel value is greater than said first source pixel value and said second source pixel value is greater than said central source pixel value;
(b) a second difference between said central source pixel value and said second source pixel value if said central source pixel value is greater than said second source pixel value and said first source pixel value is greater than said central source pixel value;
(c) the square root of the sum of the squares of said first and second differences if said central source pixel value is greater than said first and second source pixel values; and
(d) zero if said central source pixel value is less than said first and second source pixel values.

8. The imaging system as defined in claim 7, wherein said first dilation gradient for said first dilation step comprises one of the following values:
(a) a first difference between said central eroded pixel s value and said first eroded pixel value if said central eroded pixel value is greater than said second eroded pixel value and said first eroded pixel value is greater than said central eroded pixel value;
(b) a second difference between said central eroded pixel value and said second eroded pixel value if said central eroded pixel value is greater than said first eroded pixel value and said second eroded pixel value is greater than said central eroded pixel value;
(c) the square root of the sum of the squares of said first and second differences if said central eroded pixel value is less than said first and second eroded pixel values; and
(d) zero if said central eroded pixel value is greater than said first and second eroded pixel values.

9. The imaging system as defined in claim 6, wherein said dilation quantity is a function of the square root of the sum of the squares of said first, second and third dilation gradients.

10. The imaging system as defined in claim 5, wherein said erosion quantity is a function of the square root of the sum of the squares of said first, second and third erosion gradients.

11. A system for three-dimensional imaging of an ultrasound scattering medium in an object volume, comprising:
an ultrasound transducer array for transmitting ultrasound beams and detecting ultrasound echoes reflected in a scanning plane intersecting the object volume at a multiplicity of sample volumes in said scanning plane;
means for acquiring pixel data derived at least in part from ultrasound echoes reflected by the scattering medium, each pixel datum of said data corresponding to a respective one of said multiplicity of sample volumes in said scanning plane;
a memory for storing a respective frame of source pixel values for each of a multiplicity of successive scanning planes, the respective frames of source pixel values forming a source data volume;
a central processing unit including:
a morphological filter for filtering said source data volume to form a morphologically filtered data volume having less speckle than said source data volume, and a random access memory for projecting said morphologically filtered data volume onto an image plane to form a projected data set representing a projected image;

a display monitor for displaying said projected image in the form of a multiplicity of pixels; and a video processor coupled to said display monitor for displaying said projected image on said display device.

12. The system as defined in claim 11, wherein said morphological filter comprises:
   (a) means for determining the relative values of a central source pixel value and first and second source pixel values adjacent to said central source pixel value in a predetermined direction, and for computing an erosion gradient which is a function of a difference between said central source pixel value and one of said first and second source pixel values for said direction;
   (b) means for computing an erosion quantity as a function of said erosion gradient; and
   (c) means for subtracting said erosion quantity from said central source pixel value to form an eroded pixel value.

13. The system as defined in claim 12, wherein said morphological filter further comprises:
   (a) means for determining the relative values of a central eroded pixel value and first and second eroded pixel values adjacent to said central eroded pixel value in said direction, and for computing a dilation gradient which is a function of a difference between said central eroded pixel value and one of said first and second eroded pixel values for said direction;
   (b) means for computing a dilation quantity as a function of said dilation gradient; and
   (c) means for adding said dilation quantity to said central eroded pixel value to form a morphologically filtered pixel value.

14. An imaging system, comprising:
a memory for storing a source data volume of source pixel values;
a central processing unit including:
   a morphological filter for filtering said source data volume to form a morphologically filtered data volume having less speckle than said source data volume, and
   a random access memory for projecting said morphologically filtered data volume onto an image plane to form a projected data set representing a projected image;
a display monitor for displaying said projected image in the form of a multiplicity of pixels; and
a video processor coupled to said display monitor for displaying said projected image on said display device.

15. The imaging system as defined in claim 14, wherein said morphological filter comprises:
   (a) means for determining the relative values of a central source pixel value and first and second source pixel values adjacent to said central source pixel value in a predetermined direction, and for computing an erosion gradient which is a function of a difference between said central source pixel value and one of said first and second source pixel values for said direction;
   (b) means for computing an erosion quantity as a function of said erosion gradient; and
   (c) means for subtracting said erosion quantity from said central source pixel value to form an eroded pixel value.

16. The imaging system as defined in claim 15, wherein said morphological filter further comprises:
   (a) means for determining the relative values of a central eroded pixel value and first and second eroded pixel values adjacent to said central eroded pixel value in said direction, and for computing a dilation gradient which is a function of a difference between said central eroded pixel value and one of said first and second eroded pixel values for said direction;
   (b) means for computing a dilation quantity as a function of said dilation gradient; and
   (c) means for adding said dilation quantity to said central eroded pixel value to form a morphologically filtered pixel value.

17. The imaging system as defined in claim 14, further comprising:
an ultrasound transducer array including a multiplicity of transducer elements;
a beamformer coupled to said transducer elements for pulsing said transducer elements during a series of transmit firings and for acquiring a respective receive signal from said transducer elements subsequent to each transmit firing;
a signal processor programmed to form respective image signals from the receive signals; and
a scan converter for converting said image signals into said source data volume of pixel values and for providing said source data volume to said memory for storage therein.

18. A method for three-dimensional imaging of an ultrasound scattering medium in an object volume, comprising the following steps:
transmitting ultrasound beams in a scanning plane intersecting the object volume at a multiplicity of sample volumes in said scanning plane;
detecting ultrasound echoes reflected from said multiplicity of sample volumes in said scanning plane;
scanning said scanning plane through the object volume;
acquiring pixel data derived at least in part from ultrasound echoes reflected by the scattering medium, each pixel datum of said data corresponding to a respective one of said multiplicity of sample volumes;
storing acquired pixel data for each of said multiplicity of sample volumes to form a source data volume;
morphologiocally filtering said source data volume to form a morphologically filtered data volume having less speckle than said source data volume;
projecting said morphologically filtered data volume onto an image plane to form a projected data set representing a projected image; and
displaying said projected image.

19. A method for three-dimensional imaging of matter in an object volume, comprising the steps of:
acquiring a source data volume of source pixel values representing said matter in said object volume;
morphologically filtering said source data volume to form a morphologically filtered data volume having less speckle than said source data volume;
projecting said morphologically filtered data volume onto an image plane to form a projected data set representing a projected image; and
displaying said projected image.

20. The method as defined in claim 19, wherein the step of morphologically filtering comprises performing n erosion steps followed by n dilation steps, where n is a positive integer.

21. The method as defined in claim 20, wherein n=3.

22. The method as defined in claim 20, wherein a first one of said erosion steps comprises:

(a) for each of first, second and third directions, determining the relative values of a central source pixel value and first and second source pixel values adjacent to said central source pixel value, and computing first, second and third erosion gradients, respectively, each of said first, second and third erosion gradients being a function of a difference between said central source pixel value and one of said first and second source pixel values for the respective direction;

(b) computing an erosion quantity as a function of said first, second and third erosion gradients; and (c) subtracting said erosion quantity from said central source pixel value to form an eroded pixel value.

23. The method as defined in claim 22, wherein a first one of said dilation steps comprises:

(a) for each of first, second and third directions, determining the relative values of a central eroded pixel value and first and second eroded pixel values adjacent to said central eroded pixel value, and computing first, second and third dilation gradients, respectively, each of said first, second and third dilation gradients being a function of a difference between said central eroded pixel value and one of said first and second eroded pixel values for the respective direction;

(b) computing a dilation quantity as a function of said first, second and third dilation gradients; and (c) adding said dilation quantity to said central eroded pixel value.

24. The method as defined in claim 23, wherein said first erosion gradient for said first erosion step comprises one of the following values:

(a) a first difference between said central source pixel value and said first source pixel value if said central source pixel value is greater than said first source pixel value and said second source pixel value is greater than said central source pixel value;

(b) a second difference between said central source pixel value and said second source pixel value if said central source pixel value is greater than said second source pixel value and said first source pixel value is greater than said central source pixel value;

(c) the square root of the sum of the squares of said first and second differences if said central source pixel value is greater than said first and second source pixel values; and (d) zero if said central source pixel value is less than said first and second source pixel values.

25. The method as defined in claim 24, wherein said first dilation gradient for said first dilation step comprises one of the following values:

(a) a first difference between said central eroded pixel value and said first eroded pixel value if said central eroded pixel value is greater than said second eroded pixel value and said first eroded pixel value is greater than said central eroded pixel value;

(b) a second difference between said central eroded pixel value and said second eroded pixel value if said central eroded pixel value is greater than said first eroded pixel value and said second eroded pixel value is greater than said central eroded pixel value;

(c) the square root of the sum of the squares of said first and second differences if said central eroded pixel value is less than said first and second eroded pixel values; and (d) zero if said central eroded pixel value is greater than said first and second eroded pixel values.

26. The method as defined in claim 23, wherein said dilation quantity is a function of the square root of the sum of the squares of said first, second and third dilation gradients.

27. The method as defined in claim 22, wherein said erosion quantity is a function of the square root of the sum of the squares of said first, second and third erosion gradients.

* * * * *